United States Patent
Brooks et al.

(10) Patent No.: US 10,421,486 B2
(45) Date of Patent: *Sep. 24, 2019

(54) FOUR WHEEL STEERING WITH LOCK ASSEMBLY

(71) Applicant: CNH Industrial America LLC, New Holland, PA (US)

(72) Inventors: Nathan P. Brooks, Manitowoc, WI (US); Roy A. Bittner, Cato, WI (US); Blaine A. Schwalbe, Valders, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,663

(22) Filed: May 12, 2017

(65) Prior Publication Data

US 2018/0327021 A1 Nov. 15, 2018

(51) Int. Cl.
*B62D 7/16* (2006.01)
*B62D 7/14* (2006.01)
*A01B 69/00* (2006.01)

(52) U.S. Cl.
CPC ............ *B62D 7/148* (2013.01); *A01B 69/007* (2013.01)

(58) Field of Classification Search
CPC ................................. B62D 7/142; B62D 5/061
USPC ................. 180/408–411, 414, 416, 419, 445
See application file for complete search history.

(56) References Cited

U.S. PATENT DOCUMENTS

| | | | |
|---|---|---|---|
| 3,058,368 A * | 10/1962 | Wagner | A01B 69/008 188/27 |
| 4,856,606 A | 8/1989 | Brown | |
| 5,194,851 A | 3/1993 | Kraning et al. | |
| 5,217,083 A | 6/1993 | Bachhuber et al. | |
| 5,238,077 A * | 8/1993 | Vaughn | B62D 7/159 180/415 |
| 5,335,739 A | 8/1994 | Pieterse et al. | |
| 5,758,740 A | 6/1998 | Park | |
| 5,996,722 A | 12/1999 | Price | |
| 6,050,359 A | 4/2000 | Mouri et al. | |
| 6,464,030 B1 * | 10/2002 | Hanagan | B62D 7/142 180/211 |
| 7,756,621 B2 | 7/2010 | Pillar et al. | |

(Continued)

FOREIGN PATENT DOCUMENTS

| | | |
|---|---|---|
| EP | 0597655 A1 | 5/1994 |
| WO | 0123241 A2 | 4/2001 |
| WO | 2009156738 A1 | 12/2009 |

OTHER PUBLICATIONS

LEEB PT 330/350; Efficiency and Precision; Catalog; Horsch Farming with Passion, pp. 1-25; Germany.

*Primary Examiner* — Tony H Winner
(74) *Attorney, Agent, or Firm* — Rebecca L. Henkel; Rickard K. DeMille

(57) ABSTRACT

A lock system can be provided at each rear wheel assembly of a four wheel steering system to physically lock the rear wheel assemblies in a fixed direction to safely prevent rear wheel steering when such feature is undesirable. The lock system can use an electronically controlled actuator to hydraulically drive or retract a lock cylinder to lock or unlock the rear wheel assemblies, respectively. Sensors can be used to detect whether the lock cylinders are driven or retracted by their respective actuators, so that a controller monitoring the sensors can determine whether four wheel steering is enabled or disabled.

20 Claims, 5 Drawing Sheets

(56) References Cited

U.S. PATENT DOCUMENTS

| | | |
|---|---|---|
| 7,878,291 B2 | 2/2011 | Pohl |
| 9,409,597 B2 | 8/2016 | Sudale |
| 9,550,527 B2 | 1/2017 | Brooks |
| 2006/0027411 A1* | 2/2006 | Bordini .................. B60G 3/145 180/253 |
| 2016/0096550 A1* | 4/2016 | Dames .................... B62D 7/142 180/252 |

* cited by examiner

FOUR WHEEL STEERING WITH LOCK ASSEMBLY

FIELD OF THE INVENTION

The invention relates generally to agricultural product application equipment such as self-propelled sprayers and, in particular, to a steering assembly for an agricultural machine in which a lock assembly is operable to lock a steerable leg in a first state which prevents the steerable leg from moving with respect to a swing arm and unlock the steerable leg in a second state which allows the steerable leg to move with respect to the swing arm.

BACKGROUND OF THE INVENTION

Agricultural machines such as high-clearance sprayers are getting larger and more complex, with some sprayers having four-wheel steering to improve maneuverability, such as when making tight turns in a field's headlands. Such four-wheel steering systems typically have a controller that electronically controls a single steering valve which meters hydraulic fluid to both hydraulic rear-steering cylinders to correspond to a front-steering input. However, collision-induced rear wheel misalignment and/or steering errors at one rear wheel can be difficult for the controller to manage. Furthermore, although four-wheel steering is beneficial, there are times when it may be desirable to safely prevent four-wheel steering, such as when traveling on a road at high speed. A need therefore exists for an improved system which eliminates one or more of the foregoing disadvantages.

SUMMARY OF THE INVENTION

A lock system can be provided at each rear wheel assembly of a four wheel steering system to physically lock the rear wheel assemblies in a fixed direction to safely prevent rear wheel steering when such feature is undesirable. The lock system can use an electronically controlled actuator to hydraulically drive or retract a lock cylinder to lock or unlock the rear wheel assemblies, respectively. Sensors can be used to detect whether the lock cylinders are driven or retracted by their respective actuators, so that a controller monitoring the sensors can determine whether four wheel steering is enabled or disabled.

In one aspect, each rear-steering joint system can include a locking assembly and a steering cylinder assembly. The locking assembly can include an actuator mounted to a swing arm that drives a lock cylinder or block into a yoke or pocket on a wheel support arm as a locking position. A sensor can be arranged within the locking assembly to detect when the block is in the locking position. The steering cylinder assembly can have a steering cylinder with a steering position sensor and a corresponding hydraulic control valve.

During four-wheel steering, a position (turn angle) for the rear wheels, provided by respective steering cylinders, can be measured and compared. If a difference exceeds a threshold, a warning can be sent to an operator for correction. If the difference is significant, the computer can disable four wheel-steering to avoid damage or poor handling characteristics. The system can include an interlock which defaults to locking the wheels at a constant angle by driving a block into the pocket or yoke at the steering joint. Typically the locking position locks the rear wheels straight ahead. Sensors can continuously monitor the interlocks and wheel position(s) and report to the computer to ensure the machine is not attempting to four-wheel steer against the locks.

Specifically then, one aspect of the present invention can provide a steering assembly for an agricultural machine including: a swing arm configured to move with respect to a chassis; a steerable leg coupled to the swing arm, the steerable leg being configured to move with respect to the swing arm and being configured to receive a wheel assembly; a steering cylinder coupled to the swing arm and the steerable leg, the steering cylinder being configured to control movement between the swing arm and the steerable leg for steering the wheel assembly; and a lock assembly in communication with the steerable leg, the lock assembly being operable to lock the steerable leg in a first state which prevents the steerable leg from moving with respect to the swing arm, and unlock the steerable leg in a second state which allows the steerable leg to move with respect to the swing arm.

Another aspect of the present invention can provide a four wheel steering system for an agricultural machine including: first and second front steering assemblies, each front steering assembly including: a front swing arm configured to move with respect to a chassis; a front steerable leg coupled to the front swing arm, the front steerable leg being configured to move with respect to the front swing arm and being configured to receive a front wheel assembly; and a front steering cylinder coupled to the front swing arm and the front steerable leg, the front steering cylinder being configured to control movement of the front steerable leg for steering the front wheel assembly; first and second rear steering assemblies, each rear steering assembly including: a rear swing arm configured to move with respect to a chassis; a rear steerable leg coupled to the swing arm, the rear steerable leg being configured to move with respect to the rear swing arm and being configured to receive a rear wheel assembly; a rear steering cylinder coupled to the rear swing arm and the rear steerable leg, the rear steering cylinder being configured to control movement between the rear swing arm and the rear steerable leg for steering the rear wheel assembly; and a lock assembly in communication with the rear steerable leg, the lock assembly being operable to lock the rear steerable leg in a first state which prevents the rear steerable leg from moving with respect to the rear swing arm, and unlock the rear steerable leg in a second state which allows the rear steerable leg to move with respect to the rear swing arm.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
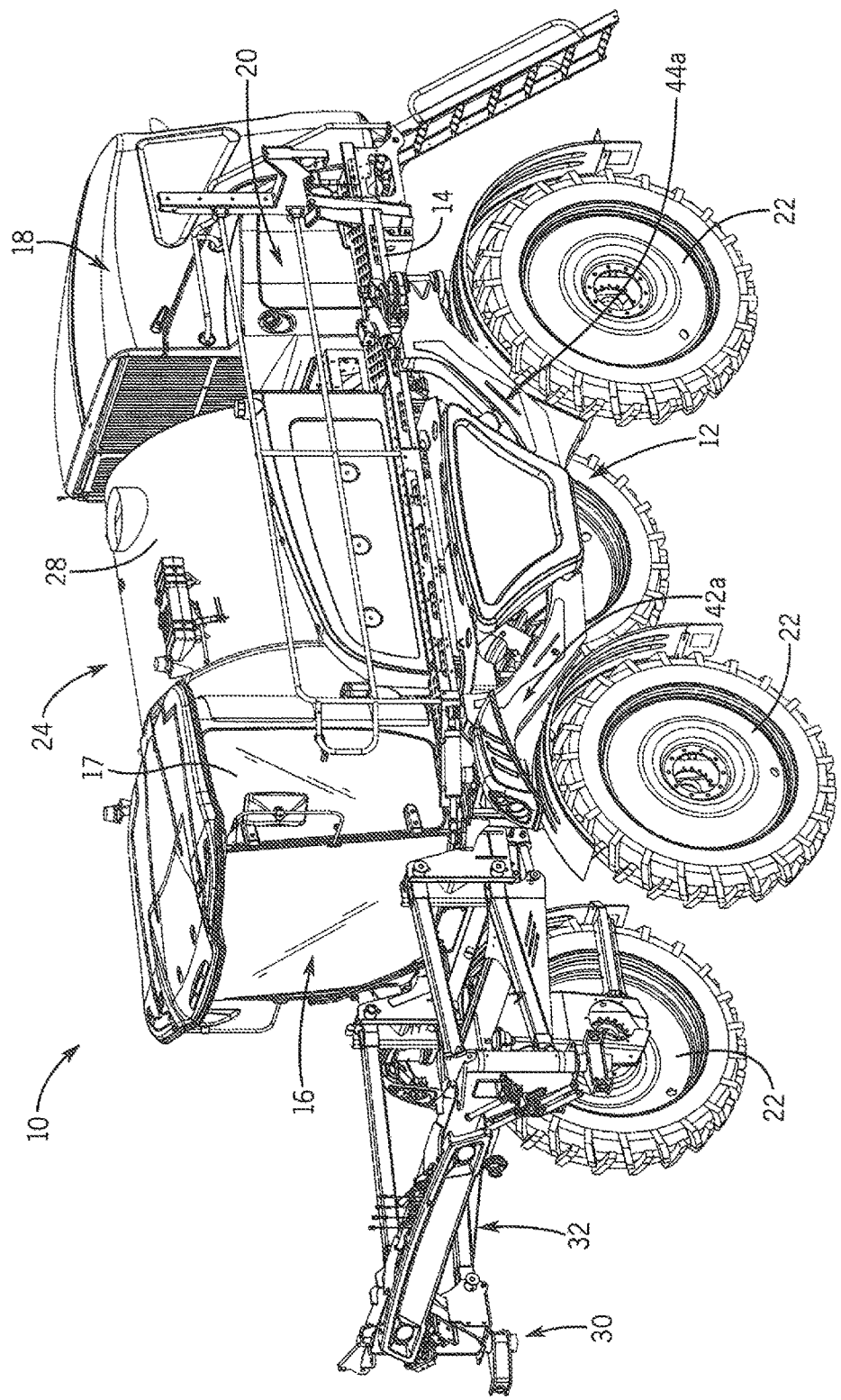
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

The sprayer 10 can operate in a two wheel steering mode or a four wheel steering mode. In the two wheel steering mode, the front wheels can be steered by the operator while the rear wheels are locked straight. The two wheel steering mode can be advantageous for operating at higher speeds and/or rough terrain. However, in the four wheel steering mode, the front and rear wheels can be steered by the operator. The four wheel steering mode can be advantageous for operating at lower speeds and/or tighter turns.

Figure 2:
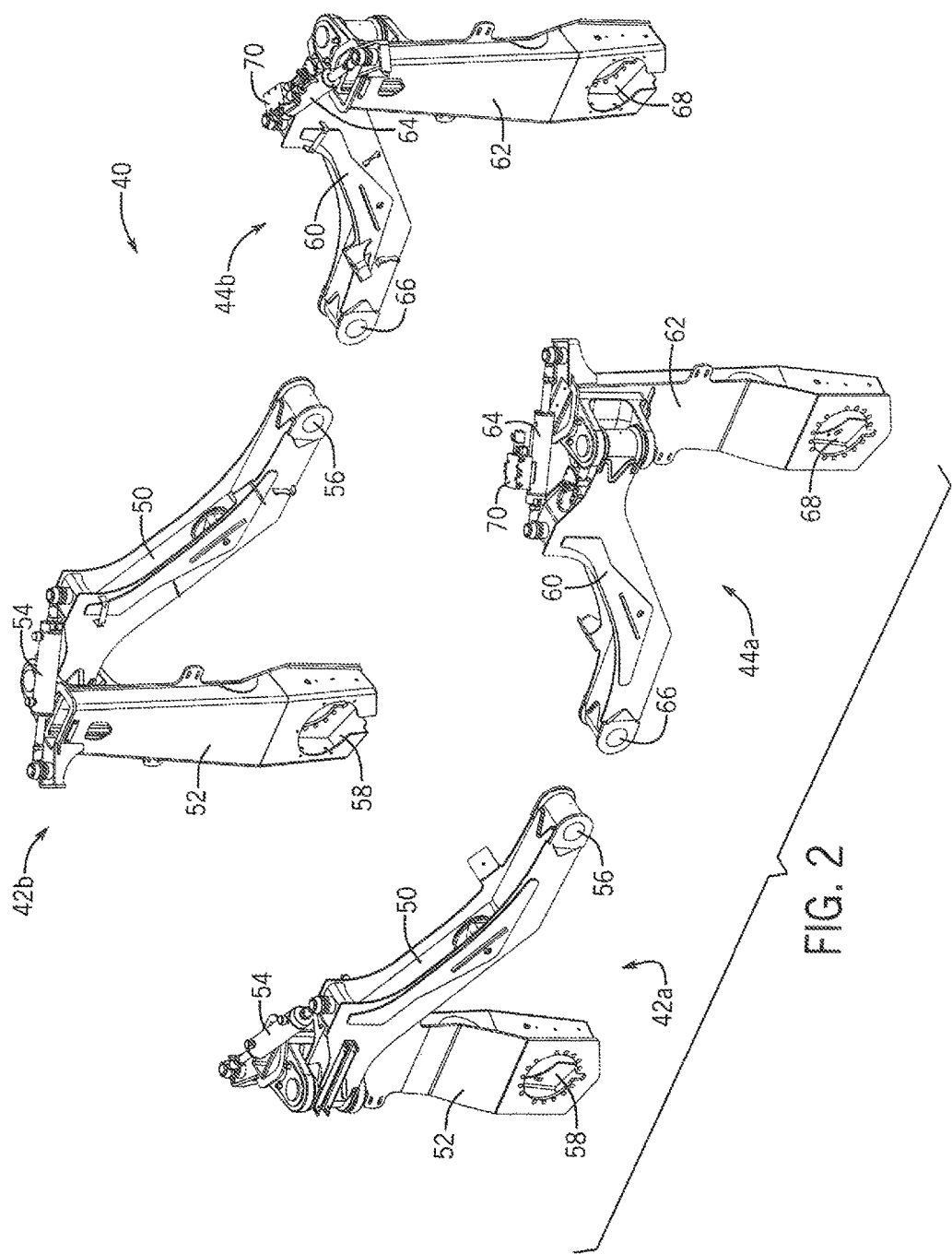
FIG. 2 is an isometric view of a four wheel steering system for the agricultural machine of FIG. 1.

With additional reference to FIG. 2, a four wheel steering system 40 for the sprayer 10 can include first and second front steering assemblies 42a and 42b, respectively, and first and second rear steering assemblies 44a and 44b, respectively. Each front steering assembly 42 can include: a front swing arm 50, a front steerable leg 52, and a front steering cylinder 54, among other things. The front swing arm 50 can be configured to move with respect to the chassis 12, such as by rotating vertically (up or down) with respect to the ground, at a front swing arm chassis connection point 56. The front steerable leg 52 can be coupled to the front swing arm 50 and can be configured to move with respect to the front swing arm 50, such as by rotating horizontally (left or right) with respect to the ground, as will be further described below. The front steerable leg 52 can also be configured to receive a front wheel assembly, such as a wheel 22, at a front wheel assembly connection point 58. The front steering cylinder 54 can be coupled to the front swing arm 50 and the front steerable leg 52, so that the front steering cylinder 54 can control movement of the front steerable leg 52 for steering the wheel 22 at the front wheel assembly connection point 58 and, in turn, for steering the sprayer 10.

Similarly, each rear steering assembly 44 can include: a rear swing arm 60, a rear steerable leg 62, and a rear steering cylinder 64, among other things. The rear swing arm 60 can also be configured to move with respect to the chassis 12, such as by rotating vertically (up or down) with respect to the ground, at a rear swing arm chassis connection point 66. The rear steerable leg 62 can be coupled to the rear swing arm 60 and can be configured to move with respect to the rear swing arm 60, such as by rotating horizontally (left or right), with respect to the ground, as will be further described below. The rear steerable leg 62 can also be configured to receive a rear wheel assembly, such as a wheel 22, at a rear wheel assembly connection point 68. The rear steering cylinder 64 can be coupled to the rear swing arm 60 and the rear steerable leg 62, so that the rear steering cylinder 64 can control movement of the rear steerable leg 62 for steering the wheel 22 at the rear wheel assembly connection point 68 and, in turn, for steering the sprayer 10.

Figure 5:
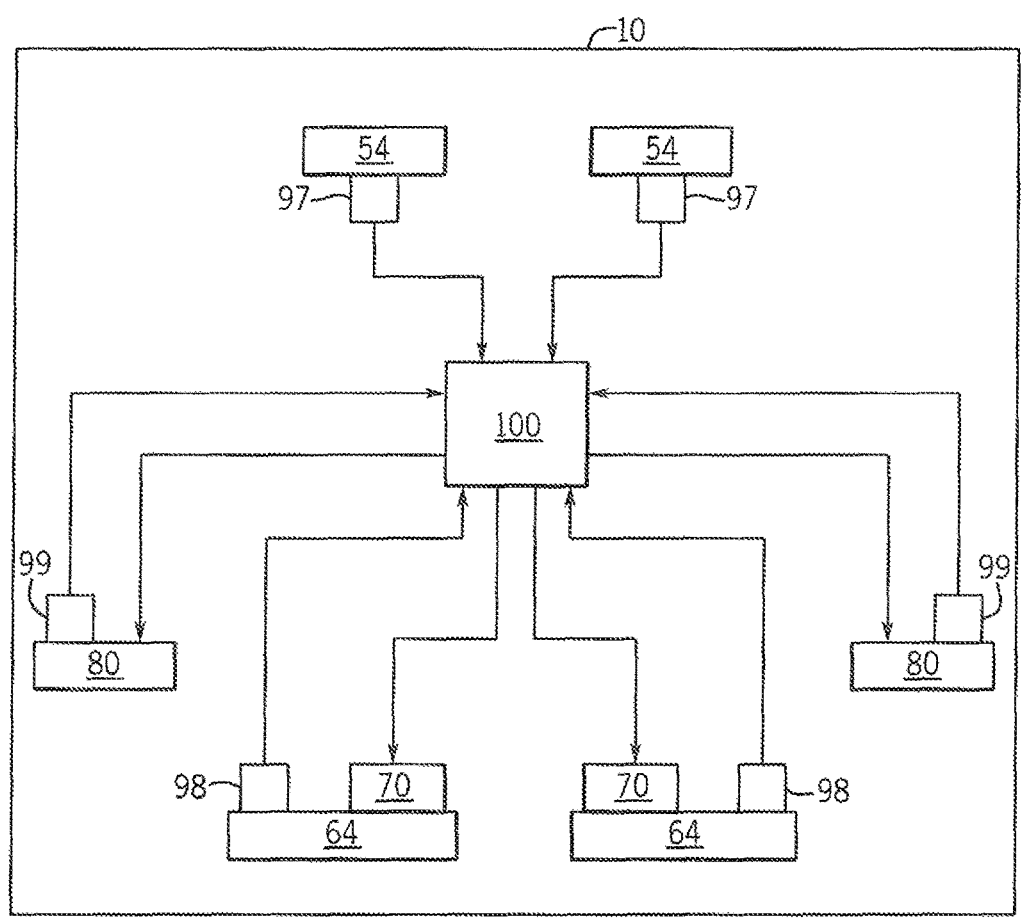
FIG. 5 is a block diagram illustrating electronic control for the four wheel steering system of FIG. 2.

An electronically controlled valve 70 can be directly mounted to the rear steering cylinder 64 for controlling the rear steering cylinder 64 (see also FIG. 5). The electronically controlled valve 70 can be advantageously mounted directly to the rear steering cylinder 64 without any interconnecting hydraulic hoses in between the electronically controlled valve 70 and the rear steering cylinder 64 by using directly attached inlets/outlets 72 (see FIG. 3). Accordingly, the electronically controlled valve 70 can be controlled by a controller 100 (see FIG. 5) to hydraulically adjust the rear steering cylinder 64 to control the movement for steering the wheel 22 at the rear wheel assembly connection point 68.

Figure 3:
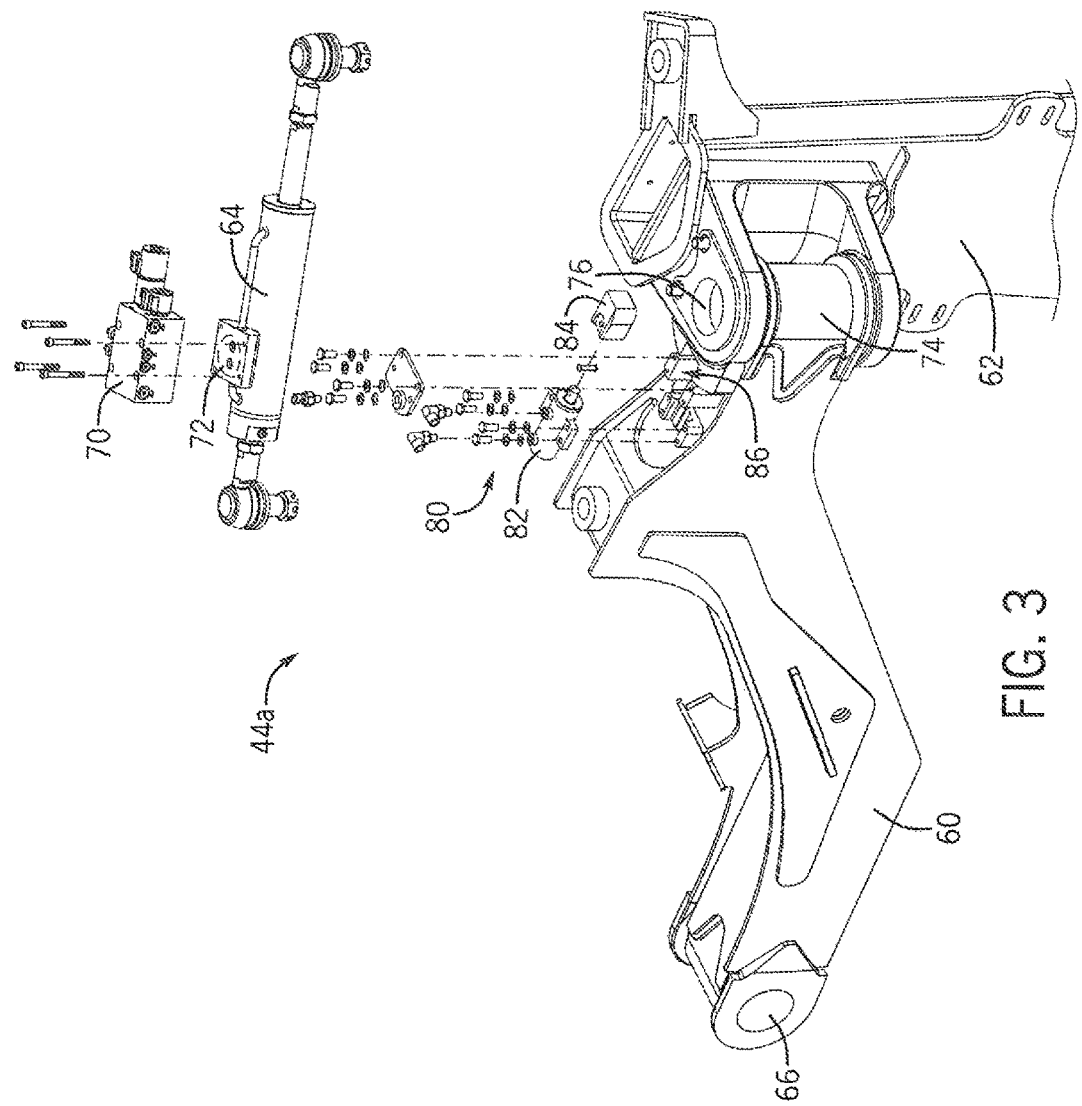
FIG. 3 is an exploded isometric view of a rear steering assembly in the four wheel steering system of FIG. 2.

With additional reference to FIG. 3, an exploded isometric view of an exemplar rear steering assembly 44, such as the first rear steering assembly 44a, is provided in accordance with an aspect of the invention. A lock assembly 80 can be provided in each rear steering assembly 44 to be in communication with the rear steerable leg 62, so as to lock the rear steerable leg 62 in a first state which prevents the rear steerable leg 62 from moving with respect to the rear swing arm 60, or unlock the rear steerable leg 62 in a second state which allows the rear steerable leg 62 to move with respect to the rear swing arm 60. The lock assembly 80 can include an actuator 82, which can be mounted directly to the rear swing arm 60, and a lock cylinder 84, which can be hydraulically driven by the actuator 82. The rear steerable leg 62 can provide a pocket 86 that is axially aligned with the actuator 82 and a path of the lock cylinder 84. Accordingly, the actuator 82 can be electronically controlled by the controller 100 (see FIG. 5) to hydraulically drive the lock cylinder 84 into the pocket 86 in the first state to lock the rear steerable leg 62 to prevent rear steering, or hydraulically retract the lock cylinder 84 from the pocket 86 in the second state to unlock the rear steerable leg 62 to allow steering.

In one aspect, the swing arms and steerable legs of the front and rear steering assemblies 42 and 44, respectively, can be coupled using clevis fasteners. By way of example, with respect to the first rear steering assembly 44*a*, an end 74 of the rear swing arm 60 can be configured as a clevis, and the rear steerable leg 62 can include a hole or opening 76 for receiving a king pin for fastening the clevis.

Figure 4:
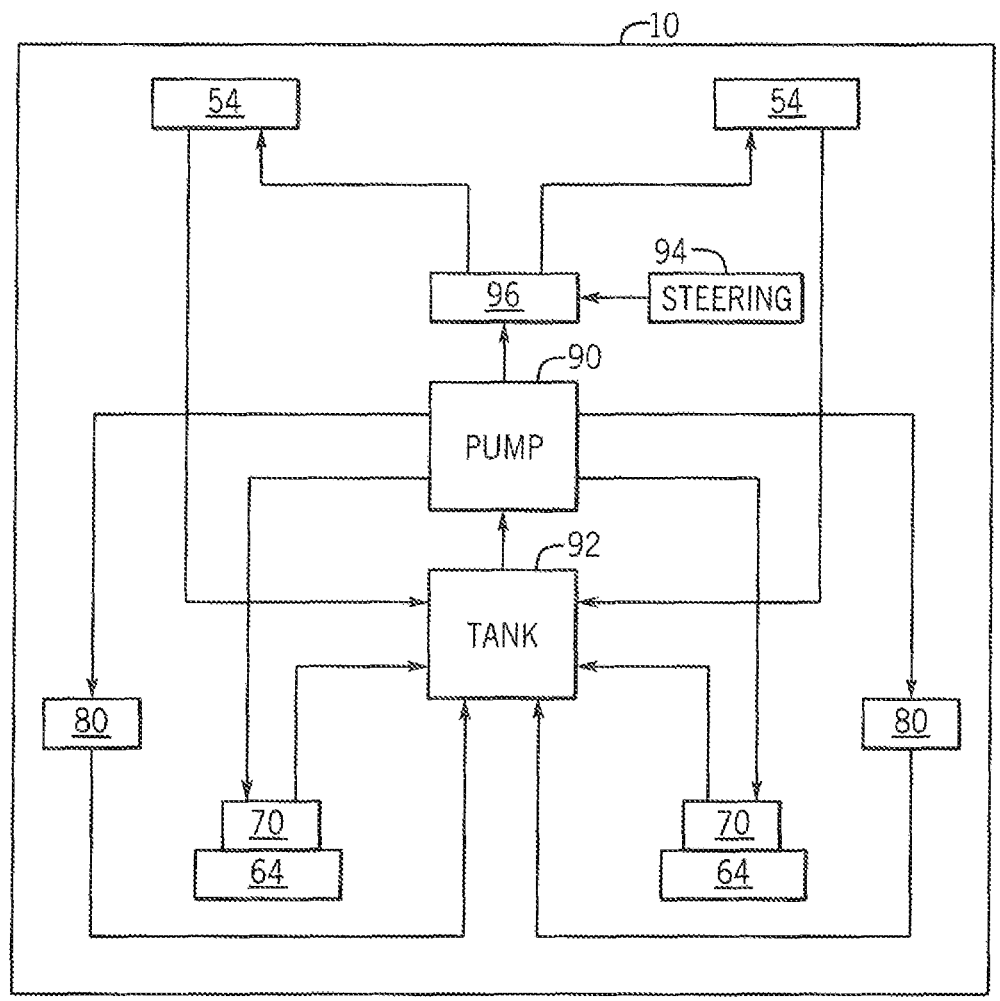
FIG. 4 is a block diagram illustrating hydraulic control for the four wheel steering system of FIG. 2.

With additional reference to FIGS. 4 and 5 together, a block diagram illustrating hydraulic control for the steering system 40 (FIG. 4), and a block diagram illustrating electronic control for the steering system 40 (FIG. 5), are provided in accordance with an aspect of the invention. Turning initially to FIG. 4, a pump 90 can draw hydraulic fluid from tank 92 for providing to various hydraulic valves in the system. For steering the first and second front steering assemblies 42*a* and 42*b*, respectively, whether in a two-wheel steering mode or a four-wheel steering mode, an operator can provide steering input, such as by way of a steering wheel, joystick, or other steering device 94, to a front hydraulic valve 96, which can be an orbital valve as known in the art. The front hydraulic valve 96, in turn, can provide hydraulic fluid driven from the pump 90 to the front steering cylinders 54 of the first and second front steering assemblies 42*a* and 42*b*, respectively, for steering the sprayer 10. The front steering cylinders 54 can, in turn, return hydraulic fluid to the tank 92.

For example, to steer to the left, the front steering cylinder 54 of the first front steering assembly 42*a* can receive more hydraulic fluid to allow a piston (in the front steering cylinder 54 of the first front steering assembly 42*a*) to push the front steerable leg 52 (of the first front steering assembly 42*a*) to the left, while the front steering cylinder 54 of the second front steering assembly 42*b* can release hydraulic fluid to the tank 92 to allow a piston (in the front steering cylinder 54 of the second front steering assembly 42*b*) to pull the front steerable leg 52 (of the second steering assembly 42*b*) to the left. Conversely, to steer to the right, the front steering cylinder 54 of the first front steering assembly 42*a* can release hydraulic fluid to the tank 92 to allow the piston (in the front steering cylinder 54 of the first front steering assembly 42*a*) to pull the front steerable leg 52 (of the first front steering assembly 42*a*) to the right, while the front steering cylinder 54 of the second front steering assembly 42*b* can receive more hydraulic fluid to allow the piston (in the front steering cylinder 54 of the second front steering assembly 42*b*) to push the front steerable leg 52 (of the second steering assembly 42*b*) to the right.

Turning also to FIG. 5, the front steering cylinders 54 can each include front steering position sensors 97 configured to sense positions of the front steering cylinder 54 of the first and second front steering assemblies 42*a* and 42*b*, respectively. The front steering position sensors 97 can be embedded cylinder position sensors operable to provide direct stroke measurements of the front steering cylinders 54 to a controller 100, which could be a microprocessor, a microcontroller or other programmable logic element configured to execute a program stored in a non-transient medium as known in the art.

In the two-wheel steering mode, the rear steering cylinders 64 of the first and second rear steering assemblies 44*a* and 44*b*, respectively, can be controlled to remain in a fixed position. The fixed position would typically be for the rear steerable legs 62 of the first and second rear steering assemblies 44*a* and 44*b*, respectively, to be straight. However, in alternative aspects, the fixed position could be for the rear steerable legs 62 of the first and second rear steering assemblies 44*a* and 44*b*, respectively, to be at a common angle. In one aspect, the fixed position for the first and second rear steering assemblies 44*a* and 44*b*, respectively, can be achieved by providing, releasing and/or locking hydraulic fluid to the rear steering cylinders 64 of the first and second rear steering assemblies 44*a* and 44*b*, respectively, by an amount sufficient to hold the rear steering cylinders 64 in the desired fixed position.

Like the front steering cylinders 54, the rear steering cylinders 64 can each also include rear steering position sensors 98 configured to sense a position of the rear steering cylinders 64 of the first and second rear steering assemblies 44*a* and 44*b*, respectively. The rear steering position sensors 98 can be embedded cylinder position sensors operable to provide direct stroke measurements of the rear steering cylinders 64 to the controller 100. The controller 100, in turn, can monitor the position of the rear steering cylinders 64, in addition to the front steering cylinders 64, to allow the controller 100 to achieve the fixed position with respect to the rear steerable legs 62.

In addition, or alternatively, in the two-wheel steering mode, the lock assemblies 80 of the first and second rear steering assemblies 44*a* and 44*b*, respectively, can be engaged in the first state to lock the rear steerable legs 60 to prevent rear steering. For example, to lock the rear steerable legs 60 in the first state, the actuator 82 can adjust hydraulic fluid between the pump 90 and the tank 92 to allow a piston (in the actuator 82) to push the lock cylinder 84 into the pocket 86. Conversely, to unlock the rear steerable legs 60 in the second state, such as for the four-wheel steering mode, the actuator 82 can adjust hydraulic fluid between the pump 90 and the tank 92 to allow the piston (in the actuator 82) to pull or retract the lock cylinder 84 from the pocket 86.

Accordingly, in one aspect, in the two wheel steering mode, the front steerable legs 52 of the first and second front steering assemblies 42*a* and 42*b*, respectively, can be used to steer the sprayer 10 while the rear steerable legs 62 of the first and second rear steering assemblies 44*a* and 44*b*, respectively, can be held in a fixed position by the rear steering cylinders 64 and/or the lock assemblies 80. However, in the four wheel steering mode, the rear steerable legs 62 of the first and second rear steering assemblies 44*a* and 44*b*, respectively, can be controlled by the controller 100 to substantially correspond to the angle of the front steerable legs 52 of the first and second front steering assemblies 42*a* and 42*b*, respectively.

For example, the controller 100 can determine first and second positions corresponding to the front steerable legs 52 of the first and second front steering assemblies 42*a* and 42*b*, respectively, from the front steering position sensor 97. The controller 100 can then control the electronically controlled valve 70 of the first rear steering assembly 44*a* to hydraulically adjust the rear steering cylinder 64 of the first rear steering assembly 44*a* to a position corresponding to the front steering cylinder 54 of the first front steering assembly 42*a*. The position of the rear steering cylinder 64 of the first rear steering assembly 44*a* can be monitored and corrected by the controller 100 in a first closed loop control system. In addition, the controller 100 can control the electronically controlled valve 70 of the second rear steering assembly 44*b* to hydraulically adjust the rear steering cylinder 64 of the second rear steering assembly 44*b* to a position corresponding to the front steering cylinder 54 of the second front steering assembly 42b. The position of the rear steering cylinder 64 of the second rear steering assembly 44b can also be monitored and corrected by the controller 100 in a second closed loop control system. As a result, the controller can control the electronically controlled valves 70 of the first and second rear steering assemblies 44a and 44b, respectively, independently from one another, to effectively four wheel steer the sprayer 10.

The lock assemblies 80 of the first and second rear steering assemblies 44a and 44b, respectively, can each includes a lock sensor 99 configured to sense the lock cylinder 84 driven into the pocket 86 in the first state and/or the lock cylinder 84 retracted from the pocket 86 in the second state. In one aspect, the lock sensors 99 could be pressure sensors configured with respect to the actuator 82 and/or the pocket 86 to actuate upon contact. In another aspect, the lock sensors 99 could be Hall effect sensors configured with respect to the actuator 82 and/or the pocket 86 to detect proximity of the lock cylinder 84. The controller 100, in turn, can monitor the lock assemblies 80 via the lock sensors 99.

Accordingly, the controller 100 can control the actuators 82 to drive the lock cylinders 84 into the pockets 86 in the first state (locked) in the two wheel steering mode. Moreover, the controller 100 can control the actuators 82 to drive the lock cylinders 84 into the pockets 86 in the first state (locked) when a difference between the positions of front steering assemblies, sensed by the front steering position sensors 97, and the positions of rear steering assemblies, sensed by the rear steering position sensors 98, exceeds a threshold.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A steering arrangement for an agricultural machine comprising:
    first and second steering assemblies, each steering assembly including:
        a swing arm configured to move with respect to a chassis;
        a steerable leg coupled to the swing arm, the steerable leg being configured to move with respect to the swing arm and being configured to receive a wheel assembly;
        a steering cylinder coupled to the swing arm and the steerable leg, the steering cylinder being configured to control movement between the swing arm and the steerable leg for steering the wheel assembly; and
        a lock assembly in communication with the steerable leg, the lock assembly being operable to lock the steerable leg in a first state which prevents the steerable leg from moving with respect to the swing arm, and unlock the steerable leg in a second state which allows the steerable leg to move with respect to the swing arm.

2. The steering arrangement of claim 1, wherein the lock assembly of each steering assembly comprises an actuator configured to drive a lock cylinder.

3. The steering arrangement of claim 2, wherein the actuator of each steering assembly is coupled to the swing arm of a corresponding steering assembly, the steerable leg of each steering assembly provides a pocket, and the actuator of each steering assembly is configured to drive the lock cylinder into the pocket of the corresponding steering assembly.

4. The steering arrangement of claim 3, wherein the actuator of each steering assembly is electronically controlled to hydraulically drive the lock cylinder of the corresponding steering assembly.

5. The steering arrangement of claim 4, wherein the lock assembly of each steering assembly includes a lock sensor configured to sense the lock cylinder of the corresponding steering assembly driven into the pocket in the first state or the lock cylinder of the corresponding steering assembly retracted from the pocket in the second state.

6. The steering arrangement of claim 1, wherein the swing arm of each steering assembly is configured to move by rotating vertically with respect to the chassis.

7. The steering arrangement of claim 6, wherein the steerable leg of each steering assembly is configured to move by rotating horizontally with respect to the swing arm.

8. The steering arrangement of claim 7, wherein an end of the swing arm of each steering assembly is configured as a clevis, and wherein the steerable leg of each steering assembly includes a hole for receiving a king pin for fastening the clevis.

9. A steering assembly for an agricultural machine comprising:
    a swing arm configured to move with respect to a chassis;
    a steerable leg coupled to the swing arm, the steerable leg being configured to move with respect to the swing arm and being configured to receive a wheel assembly;
    a steering cylinder coupled to the swing arm and the steerable leg, the steering cylinder being configured to control movement between the swing arm and the steerable leg for steering the wheel assembly; and
    a lock assembly in communication with the steerable leg, the lock assembly being operable to lock the steerable leg in a first state which prevents the steerable leg from moving with respect to the swing arm, and unlock the steerable leg in a second state which allows the steerable leg to move with respect to the swing arm;
wherein:
    the lock assembly comprises an actuator configured to drive a lock cylinder;
    the actuator is coupled to the swing arm, the steerable leg provides a pocket, and the actuator is configured to drive the lock cylinder into the pocket;
    the actuator is electronically controlled to hydraulically drive the lock cylinder;
    the lock assembly includes a lock sensor configured to sense the lock cylinder driven into the pocket in the first state or the lock cylinder retracted from the pocket in the second state; and
    the steering cylinder is electronically controlled by a hydraulic valve that is directly mounted to the steering cylinder without an interconnecting hydraulic hose in between the hydraulic valve and the steering cylinder.

10. The steering assembly of claim 9, wherein the steering cylinder includes a position sensor configured to sense a position of the steering cylinder.

11. The steering assembly of claim 10, further comprising a controller in communication with the position sensor and the actuator, wherein the controller is configured to control the actuator to drive the lock cylinder into the pocket in the first state.

12. A four wheel steering system for an agricultural machine comprising:

first and second front steering assemblies, each front steering assembly comprising:
  a front swing arm configured to move with respect to a chassis;
  a front steerable leg coupled to the front swing arm, the front steerable leg being configured to move with respect to the front swing arm and being configured to receive a front wheel assembly; and
  a front steering cylinder coupled to the front swing arm and the front steerable leg, the front steering cylinder being configured to control movement of the front steerable leg for steering the front wheel assembly;
first and second rear steering assemblies, each rear steering assembly comprising:
  a rear swing arm configured to move with respect to a chassis;
  a rear steerable leg coupled to the swing arm, the rear steerable leg being configured to move with respect to the rear swing arm and being configured to receive a rear wheel assembly;
  a rear steering cylinder coupled to the rear swing arm and the rear steerable leg, the rear steering cylinder being configured to control movement between the rear swing arm and the rear steerable leg for steering the rear wheel assembly; and
  a lock assembly in communication with the rear steerable leg, the lock assembly being operable to lock the rear steerable leg in a first state which prevents the rear steerable leg from moving with respect to the rear swing arm, and unlock the rear steerable leg in a second state which allows the rear steerable leg to move with respect to the rear swing arm.

13. The four wheel steering system of claim 12, wherein the lock assemblies of the first and second rear steering assemblies each comprise an actuator configured to drive a lock cylinder.

14. The four wheel steering system of claim 13, wherein the actuator is coupled to the rear swing arm, the rear steerable leg provides a pocket, and the actuator is configured to drive the lock cylinder into the pocket.

15. The four wheel steering system of claim 14, wherein the actuator is electronically controlled to hydraulically drive the lock cylinder.

16. The four wheel steering system of claim 15, wherein the lock assemblies of the first and second rear steering assemblies each include a lock sensor configured to sense the lock cylinder driven into the pocket in the first state or the lock cylinder retracted from the pocket in the second state.

17. The four wheel steering assembly of claim 12, wherein the swing arms of the first and second front steering assemblies and the first and second rear steering assemblies are each configured to move by rotating vertically with respect to the chassis, and the steerable legs of the first and second front steering assemblies and the first and second rear steering assemblies are each configured to move by rotating horizontally with respect to the swing arms.

18. A four wheel steering system for an agricultural machine comprising:
  first and second front steering assemblies, each front steering assembly comprising:
    a front swing arm configured to move with respect to a chassis;
    a front steerable leg coupled to the front swing arm, the front steerable leg being configured to move with respect to the front swing arm and being configured to receive a front wheel assembly; and
    a front steering cylinder coupled to the front swing arm and the front steerable leg, the front steering cylinder being configured to control movement of the front steerable leg for steering the front wheel assembly;
  first and second rear steering assemblies, each rear steering assembly comprising:
    a rear swing arm configured to move with respect to a chassis;
    a rear steerable leg coupled to the swing arm, the rear steerable leg being configured to move with respect to the rear swing arm and being configured to receive a rear wheel assembly;
    a rear steering cylinder coupled to the rear swing arm and the rear steerable leg, the rear steering cylinder being configured to control movement between the rear swing arm and the rear steerable leg for steering the rear wheel assembly; and
    a lock assembly in communication with the rear steerable leg, the lock assembly being operable to lock the rear steerable leg in a first state which prevents the rear steerable leg from moving with respect to the rear swing arm, and unlock the rear steerable leg in a second state which allows the rear steerable leg to move with respect to the rear swing arm;
  wherein:
    the lock assemblies of the first and second rear steering assemblies each comprise an actuator configured to drive a lock cylinder;
    the actuator is coupled to the rear swing arm, the rear steerable leg provides a pocket, and the actuator is configured to drive the lock cylinder into the pocket;
    the actuator is electronically controlled to hydraulically drive the lock cylinder, the lock assemblies of the first and second rear steering assemblies each include a lock sensor configured to sense the lock cylinder driven into the pocket in the first state or the lock cylinder retracted from the pocket in the second state; and
    the rear steering cylinders of the first and second rear steering assemblies are each electronically controlled by a hydraulic valve that is directly mounted to the rear steering cylinder without an interconnecting hydraulic hose in between the hydraulic valve and the rear steering cylinder.

19. The four wheel steering assembly of claim 18, wherein the front and rear steering cylinders each include a position sensor configured to sense a position of the steering cylinder.

20. The four wheel steering assembly of claim 19, further comprising a controller in communication with the position sensors and the actuators, wherein the controller is configured to control the actuators to drive the lock cylinders into the pockets in the first state when a difference between the positions of front steering assemblies and the positions of rear steering assemblies exceeds a threshold.

* * * * *